Patented May 15, 1923.

1,454,961

UNITED STATES PATENT OFFICE.

HENRY DREYFUS, OF LONDON, ENGLAND.

COMPOSITION CONTAINING CELLULOSIC DERIVATIVES.

No Drawing.    Application filed November 16, 1920. Serial No. 424,513.

*To all whom it may concern:*

Be it known that I, HENRY DREYFUS, a citizen of the Swiss Republic, residing at London, England, have invented certain new and useful Improvements in Composition Containing Cellulosic Derivatives, of which the following is a specification.

This invention relates to the manufacture of solutions, films artificial filaments, celluloid-like masses, electric insulating materials, varnishes, coating materials, or other compositions, preparations or articles (all of which are hereinafter included in the term "composition of matter") made with cellulosic derivatives as described below.

The invention is characterized by the employment as plasticising agents for the manufacture of compositions of matter having a basis of cellulosic derivatives, of certain alkyl sulfonamid compounds which are liquid at ordinary temperature, and which compounds become more viscous and gelatinous when cooled to very low temperatures.

In addition to the volatile solvents or diluents which are generally used in making solutions or other products such as referred to with cellulosic compounds or derivatives or in some cases even without such volatile liquids, high boiling solvents called plasticising agents are employed for the cellulose derivative or derivatives forming the basis of the solutions, compositions or products.

In the specification of a previous U. S. Patent No. 1353384 dated 21 September 1920, I have described the employment as high boiling plasticising solvents for cellulose acetate, of high boiling mixtures of isomeric xylene low-carbon alkyl sulphonamides, which mixtures are liquids at ordinary temperature and are such as can be obtained by treating an ordinary commercial xylene, distilling for example at about 135° to 146° C., by the ordinary methods of conversion into the alkyl sulphonamides, for example by treating the crude xylene with chlorosulphonic acid to form the corresponding sulphochlorides, and then with ammonia to convert these into the sulphonamides, and then methylating same to the mono or dimethyl stage or ethylating to the monoethyl stage; or by treating the said mixed sulphochlorides with amines such as methylamine, ethylamine, etc.

In the specification of another U. S. Patent No. 1353385 dated 21 September 1920, I have described the employment as high boiling plasticising solvents for cellulose acetate, of high boiling mixtures comprising o- and p-toluene low carbon alkyl sulphonamides, which mixtures are liquids at ordinary temperature, and are such as can be obtained on treating commercial toluene by ordinary methods of conversion into the alkyl sulphonamides, for example by treating the toluene with chlorosulphonic acid to form the corresponding sulphochlorides, treating the resulting raw mixture with ammonia to convert the sulphochlorides into sulphonamides, and then methylating or ethylating to the monomethyl or monoethyl stage; or by treating the said raw mixture with amines such as methylamine, ethylamine, etc.

In the specification of another application for U. S. Patent Serial No. 401,380 filed August 5, 1920, and in my British Patent 154,334 I have stated that certain other aromatic alkylated sulfonamid derivatives can be employed as high-boiling solvents for cellulose acetate, namely—

Benzene monomethyl sulfonamid. This substance boils at about 180° C. under ½ mm. pressure, is liquid at ordinary temperature and forms a clear, soft jelly at —15° C.

Benzene methyl ethyl sulfonamid. Boils at about 170°–175° C. under ½ mm. pressure, is liquid at ordinary temperature and forms a soft turbid jelly at —25° C.

Mixtures of o and p-toluene dimethyl sulfonamids. Such mixtures boil at about 133°–137° C. under 1 mm. pressure, are liquid at ordinary temperature, form slightly turbid jelly at —15° C. and a firm turbid jelly at —20° C.

Mixtures of o and p-toluene methyl ethyl sulfonamids. Such mixtures boil at about 188°–189° C. under 1 mm., are liquid at ordinary temperature, form soft, clear jellies at —15° C. and form clear jellies at —20° C.

Mixtures of o- and p-toluene diethyl sulfonamids. Such mixtures boil at about 136°–142° C. under 1 mm., are liquid at ordinary temperature, form soft, clear jelly at —10° C. and a firm, clear mass at —20° C.

o-toluene dimethyl sulfonamid. This substance boils at about 148°–152° C. under 2 mm. is liquid at ordinary temperature, forms a soft, clear jelly at —10° C. and a firm, clear jelly at —20° C.

o-toluene diethyl sulfonamid. This substance boils at about 152–155° C. under 2 mm., is liquid at ordinary temperature, forms a soft, clear jelly at −5° C. and a firm, clear jelly at −20° C.

Mixtures of isomeric xylene diethyl sulfonamids. Such mixtures boil at about 148°–154° C. under 1 mm. pressure, are liquid at ordinary temperature, and form a soft, clear jelly at −5° C. and a firm, clear jelly at −20° C.

Mixtures of isomeric xylene methyl ethyl sulfonamids. Such mixtures boil at about 155°–156° C. under 1 mm., are liquid at ordinary temperature, form clear, soft jellies at −14° C. and slightly harder jellies at −20° C.

In preparing the said benzene methyl ethyl sulfonamid derivative, ordinary commercial benzene was used, for example an impure benzene distilling between 79°–88° C. (90% going over at about 78°–80° C.)

For preparing the said mixtures of o and p-toluene alkyl sulfonamids ordinary commercial toluene was used, distilling between 95° and 132° C., and substantially pure toluene boiling at 110°–111° C. for the o-toluene dimethyl and o-toluene diethyl-sulfonamid product, whilst for the mixtures of isomeric xylene dialkyl sulfonamids an ordinary commercial xylene was used distilling between 135° and 146° C. (about 78% between 135° and 139° C.).

The preparation however is not confined to working with these particular grades of hydrocarbons. For example, pure benzene may be used for the benzene methyl sulfonamid, or purer to pure toluene may be used for producing the mixtures of o- and p-toluene alkyl sulfonamids.

The procedure followed for preparing the alkyl sulfonamid products referred to may be according to the ordinary methods of preparing such alkylated compounds via sulfochlorids, these either being treated with ammonia and then alkylated with the appropriate alkylating agent such as dimethyl sulfate or ethyl sulfuric acid salt or chlorethyl, etc., or being treated direct with amines, such as methylamine, ethylamine, etc.

In cases where the commercal or impure hydrocarbon is indicated above as having been used, the treatment was carried out thereon without separation or purification of the intermediate or final products. In the case of the o-toluene dimethyl and diethyl-sulfonamids the mixture of the o and p-toluene sulfochlorids resulting from the treatment with chlorosulfonic acid was cooled in the ordinary way (at about −10 C.) and the crystallized p-sulfochlorid was separated from the o-sulfochlorid by filtration.

The preparation of the aromatic alkyl sulfonamids hereinbefore referred to, is not however, limited to the particular procedure indicated and any other methods giving substantially similar products may be employed.

All of the above mentioned aromatic low carbon alkyl sulfonamid compounds have high boiling points, are liquid at ordinary temperature, becoming more viscous to gelatinous when cooled to low temperatures (below about 0° C.), and they are insoluble or very little soluble in water.

According to the present invention I employ any of the aforesaid high boiling aromatic low carbon alkyl sulfonamid compounds as high boiling solvents or plasticising agents in the manufacture of solutions, films artificial filaments, celluloid - like masses, electric insulating materials, varnishes, coating materials, or other compositions, preparations or articles having a basis of nitrocellulose, nitro-acetyl cellulose or other cellulose esters (other than cellulose acetate), ethyl or methyl cellulose or other ethers of cellulose, or mixtures of any of the above with each other or with cellulose acetate.

Any of the aforesaid sulphonamide derivatives or preparations may be employed, or any mixtures of two or more of them, in carrying out the invention.

The said alkylated sulphonamide derivatives or preparations may be employed in any suitable proportions, varying according to the degree of hardness, softness or pliability required in the ultimate product, or other circumstances.

They may be employed with or without any usual or suitable solvents or liquids of lower or low boiling point according to requirements.

Any known high boiling solvents or plastic inducing substances such as triacetin, and so forth, or even other aromatic sulphonamide derivatives previously proposed as plasticisers, may be added or used with the said alkylated sulphonamide derivatives or preparations. Likewise any other suitable or desired substances having particular effects may be used or added with them, such as triphenyl phosphate, tricresyl phosphate, castor oil, acid-neutralizing aliphatic derivatives of urea which are liquid or have a low melting point, such as mono-, di- or tri-methyl urea or mono-, di- or tri-ethyl urea, colouring matters, filling materials and any other material suitable for the product to be made.

The following are some examples of the manner in which the invention may be carried out, it being understood that they are given only by way of illustration and may be varied within wide limits without departing from the invention. The parts are by weight.

A. *For making celluloid-like materials.*

To each 100 parts of nitrocellulose one may take about 25 parts of benzene monomethyl sulphonamide, toluene-o-monoethyl sulphonamide, mixtures of isomeric xylene monomethyl or monoethyl sulphonamides, or others of the alklyated sulphonamide derivatives before referred to or mixtures thereof, as high boiling solvent or plasticiser, and about 10–15 parts or more of tricresylphosphate or triphenylphosphate according to the extent to which it is desired to reduce inflammability of the product, the substances being mixed together with ordinary low boiling solvents of the nitrocellulose, such for example as acetone, alcohol-ether and so forth, the mass being worked in the ordinary way in the celluloid apparatus, first in the mixers, then on the rollers and afterwards in the presses, and so on, as generally practised in the celluloid industry. The above proportions will give relatively hard celluloids.

By reducing the quantity of the alkylated sulphonamide derivatives, together with the triphenyl or tricresyl phosphate, a still harder product may be obtained.

On the other hand, by increasing the quantity of the alkylated sulphonamide derivatives, proportionately softer products are obtained. For example, if one takes to 100 parts of the nitrocellulose 100 parts of the sulphonamide derivatives, products may be obtained which are pliable like a fabric, and if less than 100 per cent. of the sulphonamide derivatives are taken per 100 parts of nitrocellulose, a proportionately stiffer product is obtained according to the reduction of the quantity of the sulphonamide derivatives, whilst if the quantity of these is increased above 100 per cent. a still more pliable celluloid-like product is obtained.

B. For films and varnishes.

The nitrocellulose may be taken as an 8 to 10 per cent. solution in a low boiling solvent thereof, such as acetone, ether-alcohol and so forth, and about 10 per cent. of one or more of the said sulphonamide derivatives (calculated on the weight of the nitrocellulose) may be mixed with the solution as a high boiling solvent or plasticiser, with or without the addition of triphenyl phosphate or tricresyl phosphate in a proportion of about 10–15% or more relatively to the quantity of the nitrocellulose.

Instead of nitrocellulose other cellulose esters or ethyl cellulose, methyl cellulose or other cellulose ethers, may be employed in the foregoing examples, a suitable solvent of the cellulose esters or ethers being employed.

What I claim and desire to secure by Letters Patent is:—

1. A composition of matter comprising nitrocellulose and a high boiling aromatic low-carbon alkyl sulfonamid preparation, which preparation is liquid at ordinary temperature and becomes more viscous and gelatinous when cooled to low temperatures.

2. A composition of matter comprising nitrocellulose and a high boiling aromatic low-carbon monalkyl sulfonamid preparation, which preparation is liquid at ordinary temperature and becomes more viscous and gelatinous when cooled to low temperatures.

In testimony whereof I have hereunto subscribed my name.

HENRY DREYFUS.